United States Patent
Litvack et al.

(10) Patent No.: US 7,209,829 B2
(45) Date of Patent: Apr. 24, 2007

(54) NAVIGATION ASSISTANCE METHOD AND SYSTEM

(75) Inventors: Kenneth Litvack, Boca Raton, FL (US); Harpreet Sangha, Jersey City, NJ (US)

(73) Assignee: NavQuest, Inc. NJ (US)

( * ) Notice: Subject to any disclaimer, the term of this patent is extended or adjusted under 35 U.S.C. 154(b) by 281 days.

(21) Appl. No.: 10/946,742

(22) Filed: Sep. 22, 2004

(65) Prior Publication Data

US 2006/0064242 A1    Mar. 23, 2006

(51) Int. Cl.
*G01C 21/34* (2006.01)
(52) U.S. Cl. .............. 701/202; 701/209; 340/984
(58) Field of Classification Search ........ 701/200–202, 701/21, 25, 206–208, 213–214; 342/357.06, 342/357.08, 357.13; 340/984–985
See application file for complete search history.

(56) References Cited

U.S. PATENT DOCUMENTS 6,469,664 B1 * 10/2002 Michaelson et al. ... 342/357.13
6,801,839 B2 * 10/2004 Kaji ........................... 701/21

* cited by examiner

*Primary Examiner*—Y. Beaulieu
(74) *Attorney, Agent, or Firm*—R. Neil Sudol; Henry D. Coleman; William J. Sapone

(57) ABSTRACT

In a navigation assistance system, information is received via the Internet from a user pertaining to a water trip contemplated by the user. The system includes a database storing waterway data. The database is accessed in response to the information from the user. At least one recommended over-water route is derived in response to the user information and in accordance with waterway data in the database, the recommended route being communicated to the user via the computer network. The deriving of the route preferably comprises including only route segments extending through operatively navigable areas.

36 Claims, 7 Drawing Sheets

NAVIGATION ASSISTANCE METHOD AND SYSTEM

BACKGROUND OF THE INVENTION

This invention relates to a method and an associated system for providing navigational assistance to marine wayfarers. More particularly, this invention relates to a method and associated system for assisting marine travelers in planning routes between trip start points and trip end points.

Well-known services exist for providing automobile drivers, via the global computer network known as the Internet, with road maps and even recommended routes for travel over highways and roads from a start address to a destination address. Boat users, however, have not been privy to such a service. There is a need for such a service, namely, an Internet-mediated navigation assistance service that provides waterway travelers with marine maps and recommended routes between trip start points and trip end points.

OBJECTS OF THE INVENTION

It is a general object of the present invention to provide a method and/or a system for assisting waterway travelers in planning marine trips.

A related general object of the present invention is to provide such a method and/or system that assists the waterway traveler in determining a marine or over-water route between a trip start point and a trip end point.

Another general object of the present invention is to provide such a method and/or system that automatically determines a recommended marine or over-water route in response to user-input information including at least a start point and an end point.

A more specific object of the present invention is to provide such a method and/or system wherein the recommended marine or over-water route is customized of personalized to the user's vessel.

These and other objects of the present invention will be apparent from the drawings and descriptions herein. Although every object of the invention is believed to be attained in at least one embodiment of the invention, there is not necessarily any single embodiment that achieves all of the objects of the invention.

SUMMARY OF THE INVENTION

A navigation assistance method comprises, in accordance with the present invention, (a) receiving, via a computer network, information from a user pertaining to a water trip contemplated by the user, (b) accessing a database storing waterway data, (c) deriving at least one recommended over-water route in response to the user information and in accordance with waterway data in the database, and communicating the route to the user via the computer network. The deriving of the route preferably comprises including only route segments extending through operatively navigable areas.

Unnavigable areas include regions that no ship, boat, raft or other water vessel can navigate, for instance, land areas such as islands. Unnavigable areas further include regions of surface water that are not deep enough for navigation at least by the user's vessel, or that are proximate to above-surface obstructions such as bridges or docks to underwater obstructions such as sandbars or submerged wrecks.

Generally, the recommended route is communicated to the user in the form of a map that is displayed on the user's computer monitor. The route may include latitude and longitude coordinates that define trip leg termini and waypoints. Alternatively, a route may be completely specified by multiple latitude and longitude coordinate pairs. In addition, course-change angles or compass bearings may be included in the route information for assisting the user in making course changes at waypoints while en route, whereby the user moves from one leg to another leg of the route.

The deriving of the recommended route typically includes generating a preliminary route and modifying the preliminary route in an optimization process to generate the recommended over-water route. The preliminary route may be suggested in whole or in part by the user (via the network), while the optimization process may be implemented by an iterative technique.

The modifying of the preliminary route typically includes comparing the preliminary route with information in the database to determine unnavigable segments of the preliminary route and replacing the unnavigable segments with navigable alternate route segments. The modifying of the preliminary route may further include incorporating route alterations in accordance with trip particulars supplied by the user, for example, minimum distance from land or any user-defined obstruction or system.

In one embodiment of the present invention, the deriving of the route includes assigning respective depth values to grid lines. In that case, the preliminary route extends along grid lines, and the modifying of the preliminary route includes replacing zig-zag portions of the preliminary route with straighter or smoother route segments. Typically, multiple straightening or smoothing iterations are required to derive an optimal route.

Preferably, the information received from the user includes a start point, an end point, and a minimal depth. The deriving of the route then includes accessing the database to account for depths along at least one route extending between the start point and the end point.

The information received from the user may further include a fuel usage rate. In that case the method may additionally comprise determining at least one refueling location for the user along the route. This refueling location may be computed by determining a distance of travel along a projected route for a tank of fuel and then determining a fueling station that is located close to the projected route prior to a fuel depletion point. It is possible to take local currents into account in determining the distance of travel and the associated fuel depletion point. Travel with a current uses less fuel than travel against a current. Currents may be river currents, tide currents, or ocean currents. The database may include data with respect to one or more of these water currents.

The information received from the user may include at least one minimal acceptable distance selected from the group consisting of minimal acceptable distance from land, minimal acceptable distance from charted hazards, and minimal distance from user provided boundaries. The information received from the user may also include at least one route segment parameter taken from the group consisting of a minimum course change angle, a minimum leg length, and a maximum leg length. The information received from the user may further includes vessel type and vessel length.

Where the database includes bridge height data, the information received from the user further may include a vertical clearance. In that case, the deriving of the route includes comparing the vertical clearance against a bridge height in the database.

The database may include depth information determined in part by tide data. In that event, the deriving of the route accounts for the tide data in part by basing a route determination on depth data as modified by the tide data. Some routes possible at high tide may not be possible at low tide.

A navigation assistance system comprises, in accordance with the present invention, a database storing waterway data including depth information, and a server computer connected to a global computer network for receiving information from a user pertaining to a water trip contemplated by the user. The server computer is connected to the database for accessing waterway data stored therein. The server computer is programmed with software for deriving at least one recommended over-water route in response to the user information and in accordance with waterway data in the database. The software comprises programming for including only route segments extending through operatively navigable areas. The server computer includes programming for communicating the route to the user via the computer network.

The software preferably includes programming for generating a preliminary route and modifying the preliminary route in an optimization process to generate the recommended over-water route. The optimization process may be iterative, whereby successive routes are generated and compared with prior versions as to, for example, total route length and number of course changes. Generally, both route length and course changes number are minimized while avoiding obstructions over and under the water. Obstructions are generally avoided by electronically assembling predetermined route segments or legs that have already been vetted and determined as being safe and navigable. Thus, the software may include programming for comparing the preliminary route (as well as other tentative routes) with information in the database to determine unnavigable segments of the preliminary route and replacing the unnavigable segments with navigable alternate route segments. Where the preliminary route is provided by the user, it is not unlikely in some cases that the preliminary route includes unnavigable segments, which is discovered by automatically or electronically comparing the preliminary route with information stored in the database.

The programming for modifying the preliminary route may include routines for incorporating route alterations in accordance with trip particulars supplied by the user.

The programming for generating the preliminary route may includes routines for defining the preliminary route pursuant to information received from the user via the computer network.

The software may additionally include programming for assigning respective depth values to grid lines. The preliminary route extends along grid lines. The programming for modifying the preliminary route then includes routines for replacing zig-zag portions of the preliminary route with straighter or smoother route segments, i.e., with fewer segments and therefore fewer course changes.

Where the information received from the user includes a start point, an end point, and a minimal depth, the software includes programming for accessing the database to account for depths along at least one route extending between the start point and the end point.

Where the information received from the user further includes a fuel usage rate, the software additionally includes programming for determining at least one refueling location for the user along the route. Where the database includes data as to water currents, this programming may include routines for calculating fuel usage in part in accordance with the water current data in the database.

As indicated above, the information received from the user may also include at least one minimal acceptable distance selected from the group consisting of minimal acceptable distance from land, minimal acceptable distance from charted hazards, and minimal distance from user provided boundaries. The information received from the user may further include at least one route segment parameter taken from the group consisting of a minimum course change angle, a minimum leg length, a maximum leg length, a vessel type and a vessel length.

Where the database includes bridge height data and the information received from the user further includes a vertical clearance, the software may further include programming for comparing the vertical clearance against a bridge height in the database. If a vertical clearance is insufficient to accommodate a vessel height, then an alternate route is constructed that does not include the bridge.

Where a selected route includes at least one waypoint, the software includes programming for computing the waypoint.

DEFINITIONS

Figure 1:
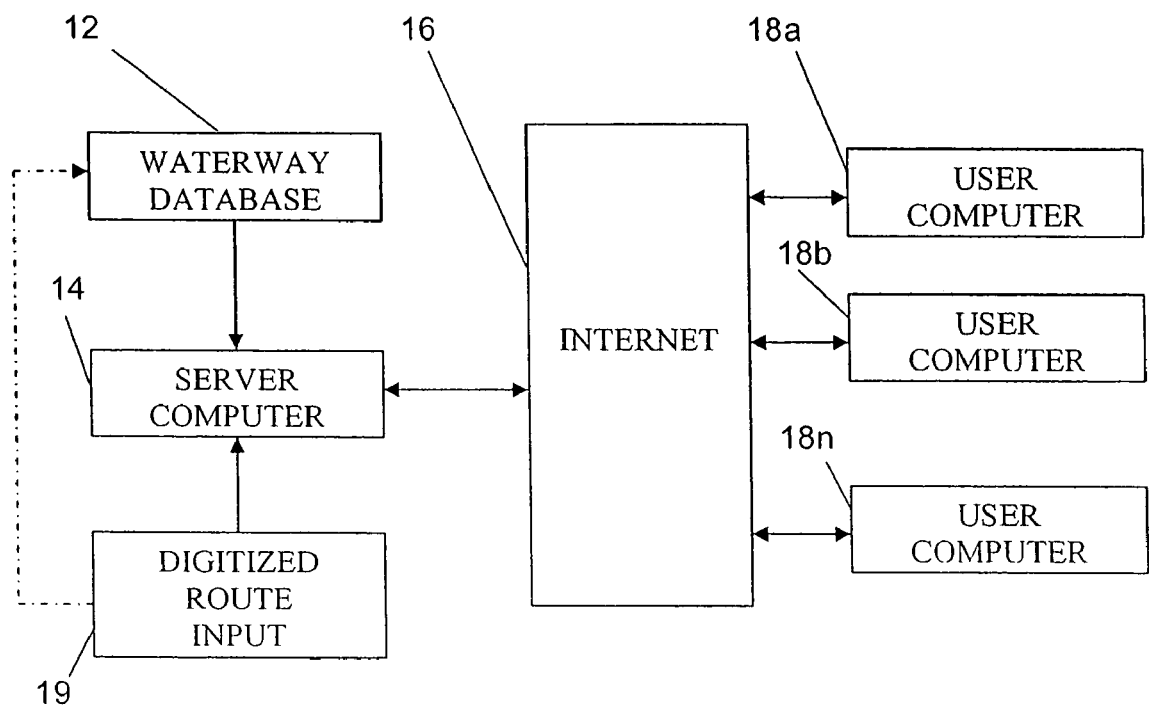
FIG. 1 is a block diagram of a navigation assistance system in accordance with the present invention.

The word "marine" is used broadly herein to denote water travel, that is, travel over waterways such as rivers, lakes, canals, harbors, coastal waters, estuaries, and oceans. Thus, the word "marine" is not limited herein to its ordinary usage as to sea and ocean travel. The word "marine" is also used to cover travel over flooded plains, swamps, and marshes, provided that those partially water covered areas are navigable at least in part. In short, the word "marine" as used herein denotes any kind of travel over (or even under) water.

The term "operatively navigable" is used herein to describe marine routes and waterway areas that can be navigated by vessels of at least one predetermined class. More specifically, in the method described herein, the term "operatively navigable" is used to describe a derived or constructed route that is suitable for a particular user's specified requirements as to a particular marine trip using a particular vessel. This recommended route will be operatively navigable for other vessels of the same type and class as the particular user's vessel. However, the particular recommended route is not necessarily operatively navigable for a vessel of a different type or size. When used in relation to predetermined digitized routes (see below). An operatively navigable route is determined to be free of obstructions, whether under, on, or above the water, to passage by a user's vessel.

The term "unnavigable" is used herein to denote regions that cannot be crossed by boat, ship, raft or other water-traveling vessel. Land regions such as islands are unnavigable according to this definition. Generally, unnavigable areas are regions that have obstructions to travel on water. The obstructions may be underwater (e.g., river bed, sandbar, submerged wreck), on the surface of the water (e.g., land mass), or over the water (e.g., docks, bridges). The term "unnavigable" may also refer to areas where surface water travel is restricted or proscribed by law or treaty. In addition, the term "unnavigable" may encompass waterway regions that are too shallow for a given vessel. Thus, whether a particular path is navigable or not depends on a particular vessel's underwater dimensions or a particular user's depth requirements.

The term "waterway data" as used herein includes waterway boundaries and, at least indirectly, depth information. Waterway boundaries generally include locations of land masses and land surface contours, while depth information may take the form of depth contours. Waterway boundaries included in stored waterway data may additionally include the locations of marker buoys, particularly buoys defining the boundaries between areas of permissible waterway travel and areas of impermissible or proscribed waterway travel. In a specific embodiment of the invention, stored waterway data may also include digitized routes.

The term "waterway route" or over-water route" as used herein designates a continuous path that a water-traveling vessel may follow between a trip start point and a trip end point. A waterway or over-water route determined by computer and communicated to a user over a network (e.g., Internet) as described herein may not extend all the way to either the start point or the end point. However, a determined waterway or over-water route will begin sufficiently close to a user-selected start point and terminate sufficiently proximate to a user-selected end point, that the user or other person following the route can easily complete the trip. A waterway or over-water route as that term is used herein typically includes a plurality of substantially linear segments joined to one another by waypoints at which navigation change.

The term "waypoint" is used herein to denote a reference point for mariners to turn or change direction or avoid obstructions or connect two legs on a route. A waypoint is defined in geospatial terms by real geospatial coordinates for navigational purposes. Waypoints act as a navigational directional references.

The phrase "digitization of routes" applies to the act of fabricating safe routes or route segments manually. Concomitantly, the term "digitized routes" is used herein to denote created or fabricated waterway routes that are predetermined to be safe for given purposes, for instance, safe for navigation by pleasure craft including sailboats, power boats, and yachts, regardless of size. There may be different classes and subclasses of digitized routes. For instance, a small-craft subclass would include all routes navigable by vessels under a predetermined size, while a commercial vessel class might accommodate specified kinds of vessels such as barges and ocean-going vessels of defined sizes. Another possible classification of digitized routes is geopolitical and includes as respective subclasses local, state, country, and international routes. In any event, the digitized routes are stored in a waterway database in digital format for use by a properly programmed computer to define a recommended waterway route for a user. As described herein, a recommended over-water route may be electronically derived by assembling a plurality of digitized route segments. A route segment may itself include multiple linear sections oriented at angles to one another. Those angles define course-changes at waypoints of a recommended route supplied to a user planning a trip.

The terms "software", "programming" and "routines" are used interchangeably herein to designate computer programs and portions of programs. The programs and portions thereof disclosed functionally herein modify generic circuits of a general purpose digital computer to form modular operational units carrying out the disclosed functions.

The term "class" is used herein to denote water traveling vessels of a given type and size. Where there is only one class, for example, for a digitized route segment, then the route segment is predetermined as being navigable by all types and sizes of vessels. In more advanced embodiments, there may be multiple classes characterized by type of boat, for instance, motor and power boats, sailboats, barges, yachts, etc., and vessel size, for instance, 15 foot and under, 15 to 25 foot, 25 to 40 foot, etc.

The term "preliminary route" as used herein refers to a first iteration of a marine route requested by a user. A preliminary route is typically modified in multiple iterations to form a series or intermediate or tentative routes. Upon completion of this iterative optimization process, that is, upon a minimization of overall route length and a minimization of the number of course changes, the finalized route is transmitted as a recommended waterway or over-water route to the requesting user.

DETAILED DESCRIPTION

FIG. 1 depicts a navigation assistance system comprises a database 12 and a server computer 14 connected to the global computer network known as the Internet 16 for providing recommended marine or waterway routes to users that utilize the services of server computer 14 via respective personal computers 18a, 18b, . . . 18n. In general, server computer 14 derives or calculates the recommended routes and provides waterway maps and the recommended routes, as well as additional information, to user computers 18a, 18b, . . . 18n in response to requests from the user computers.

Database 12 stores waterway data that at least implicitly incorporates waterway depth information. The waterway depth information may be in the form of depth values at discrete latitude and longitude coordinates, for instance, at points of a grid. Alternatively, the depth information may take the form of depth contours.

In another type of waterway data formatting, database 12 may store predetermined route segments that are categorized by depth. In a simplest implementation, database 12 may store a single depth category containing all route segments, namely, routes or portions or routes that are navigable by any vessel that would utilize the navigation assistance services described herein. Predetermined route segments are derived and entered manually into database 12 via a digitized route input device 19.

Other pertinent information also contained directly or indirectly, explicitly or implicitly, or in summary form in database 12 includes the locations of land masses and other obstructions or impediments to navigation, such as sandbars, submerged wrecks, docks, and bridges. Other types of data stored in database 12 germane to waterway access include those incorporating, encoding, or embodying legal restrictions. Database 12 may also store locations of points of usefulness or interest to marine travelers, including refueling stations, restaurants, historical sites, shipwrecks, scenic views, etc. Such points of usefulness or interest may be communicated to users together with recommended waterway routes.

The contents of database 12 may be organized according to vessel type and size. Thus, where a user has a power boat, server computer 14 may access different information in database 12 than if the user's vessel is a sailboat. Similarly, in plotting a route for a 50 foot yacht, server computer 14 would access different areas of database 12 than for a 15 foot motorboat. Where database 12 stores predetermined digitized route segments, the route segments may be organized by vessel type and size.

Figure 6:
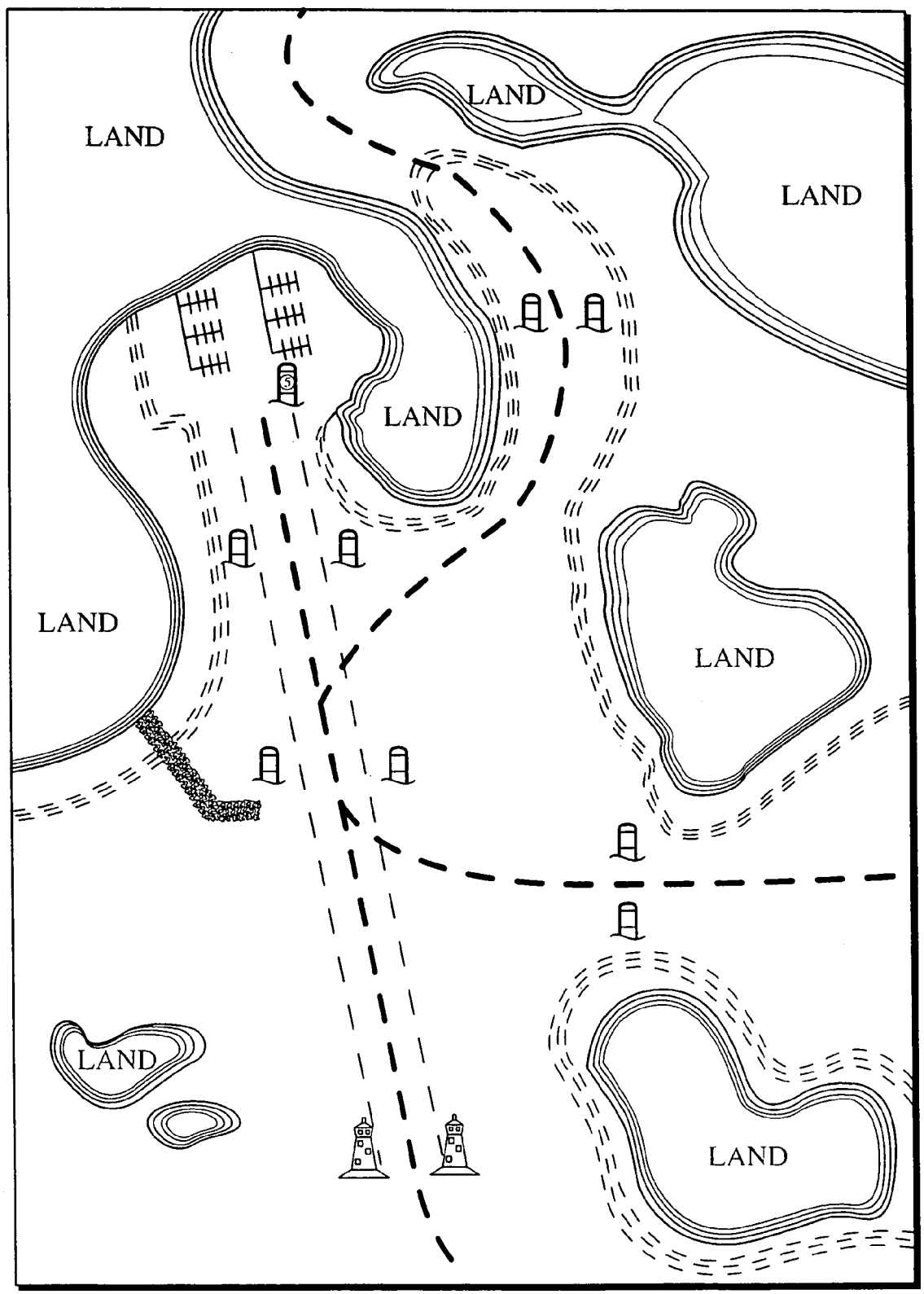
FIG. 6 is a map of an exemplary coastline, showing multiple predetermined digitized routes in accordance with the present invention.

FIG. 6 depicts an example of digitized route segments (heavy dashed lines) in the illustrative case of a harbor or bay region. The digitized routes extend in channels marked by marker buoys.

Figure 2:
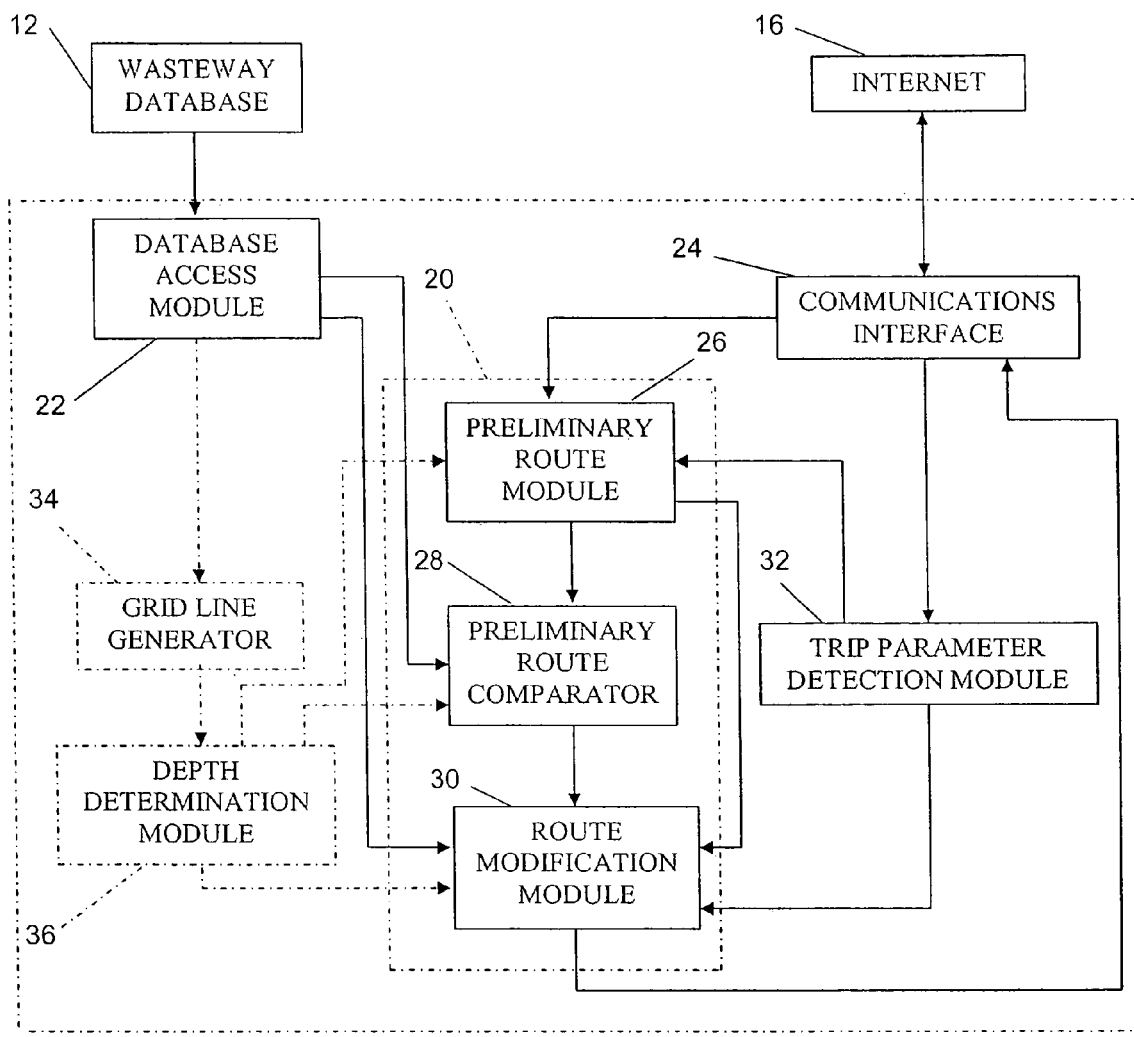
FIG. 2 is a block diagram of selected functional components of a server computer shown in FIG. 1.

As indicated above, server computer 14 is connected to the Internet 16 for receiving information from user computers 18a, 18b, . . . 18n pertaining to water trips contemplated by the respective user. As depicted in FIG. 2, server computer 14 includes a database access module 22 that is connected to database 12 for accessing, in response to user requests for assistance, waterway data stored therein. Server computer 14 is programmed with software implementing a route determination unit 20 (FIG. 2) for deriving at least one recommended over-water route in response to the user information and in accordance with waterway data in database 12.

Server computer 14 is programmed to recommend waterway routes having only route segments that extend through operatively navigable areas. Server computer 14 includes programming or a communications interface 24 (FIG. 2) for communicating with user computers 18a, 18b, . . . 18n via the Internet 16 and particularly for transmitting recommended routes to the user computers. Recommended routes that are derived or determined by server computer 14 may include maps that illustrate the routes relative to land masses, and optionally indicate surface and underwater features of potential interest to users, such as land formations, man-made structures, water current and tide information, fuel stations, marine life attractions, polluted waters, dangerous reefs, etc. Recommended routes typically include waypoint particulars including latitude and longitude coordinates, course change bearings, etc.

As illustrated in FIG. 2, server computer 14 is programmed so that route determination unit 20 includes a preliminary route module 26, a preliminary route comparator 28 and a route modification module 30. Preliminary route module 26 generates a preliminary route, either by receiving a preliminary route from a particular user computer 18a, 18b, . . . 18n, or by constructing a preliminary route based on trip start and end points and a minimum depth value all supplied by the user. (In the latter case, module 26 is connected to database 12 for receiving route data therefrom and includes routines for defining the preliminary route pursuant to the data.) Comparator 28 analyzes the preliminary route in accordance with obstruction and depth information stored explicitly or implicitly in waterway database 12 and modifies the preliminary route to avoid surface obstructions such as islands and legally proscribed areas, underwater obstructions such as sandbars and submerged wrecks, and above-water obstructions such as piers, docks, and at least low bridges. Comparator 28 feeds a corrected preliminary route to route modification module 30 which may further modify the preliminary route in an optimization process to generate a recommended over-water route. It is to be noted that the selection of a route with an adequate depth is typically based on a depth requirement specified by the user. This specified depth may be substantially larger than the actual draft of the user's vessel.

Figure 4:
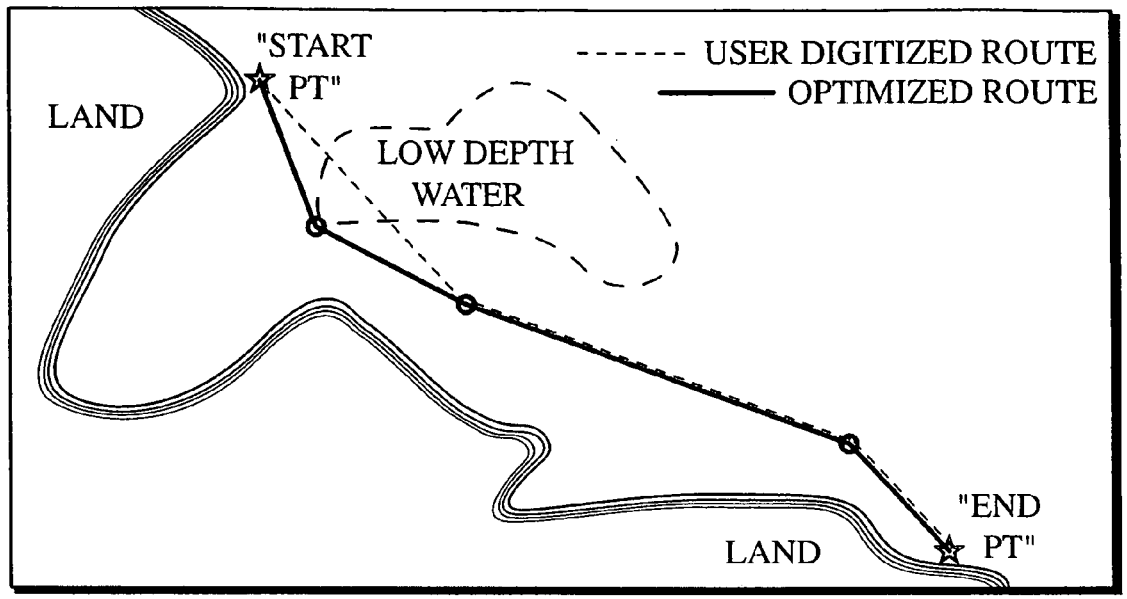
FIG. 4 is a map depicting an example of successive marine routes determined by the system of FIGS. 1–3 in carrying out a route optimization method in accordance with the present invention.

FIG. 4 shows an example of a preliminary route (dotted lines) generated by preliminary route module 26 as a user digitized route, i.e., in response to a suggestion from a user computer 18a, 18b, . . . 18n. FIG. 4 shows how the preliminary route traverses an area of shallow or low-depth water and depicts a modified preliminary route (solid lines) that avoids the shallow water.

Server computer 14 includes a trip parameter detection module 32 connected on an upstream side to communications interface 24 for receiving user-input trip parameters and on a downstream side to preliminary route module 26 and route modification module 30 for distributing the user-input parameters thereto. Optionally, server computer 14 includes a grid line generator 34 connected on an input side to waterway database 12 via access module 22 and on an output side to a depth determination module 36 in turn connected to preliminary route comparator 28 and route modification module 30.

The optimization process carried out by route modification module 30 may be iterative, whereby successive routes are generated and compared with prior versions as to total route length and number of course changes. Preferably, both the overall route length and the number of course changes in the overall route are minimized while avoiding obstructions above, on, and under the water. Where database 12 stores digitized route segments, obstructions are automatically avoided because the stored route segments have been predetermined as being safe and navigable by one or more class of vessel. Where the data stored in database 12 are not substantially preprocessed but are essentially raw data such as depth values as a function of geographical position (latitude, longitudinal) or depth contour data, the mathematical computations undertaken by route modification module 30 are necessarily more voluminous and time consuming, but may be accomplished in reasonable times provided that sufficient processing power is available.

In any event, in consulting database 12 to determine the navigability of the preliminary route from module 26 and to replace the unnavigable segments with navigable alternate route segments, comparator 28 inherently accounts for water depth. Where the preliminary route is provided by the user, it is not unlikely in some cases that the preliminary route includes unnavigable segments, which is discovered by automatically or electronically comparing the preliminary route with information stored in database 12.

As discussed above, preliminary route comparator 28 may modify the preliminary route from module 26 in accordance with waterway data stored in database 12. Comparator 28 feeds the original or modified preliminary route to route modification module and more particularly to a route buffer or register 38 therein. Buffer 38 stores the preliminary route received from comparator 28, as well as further modified versions of the route derived by module 30 during the optimization process. At the termination of the optimization process, route buffer 38 transfer the optimized route to communications interface 24 for forwarding to the respective user computer 18a, 18b, . . . 18n as a recommended waterway route in response to the user's request for navigation assistance.

Figure 3:
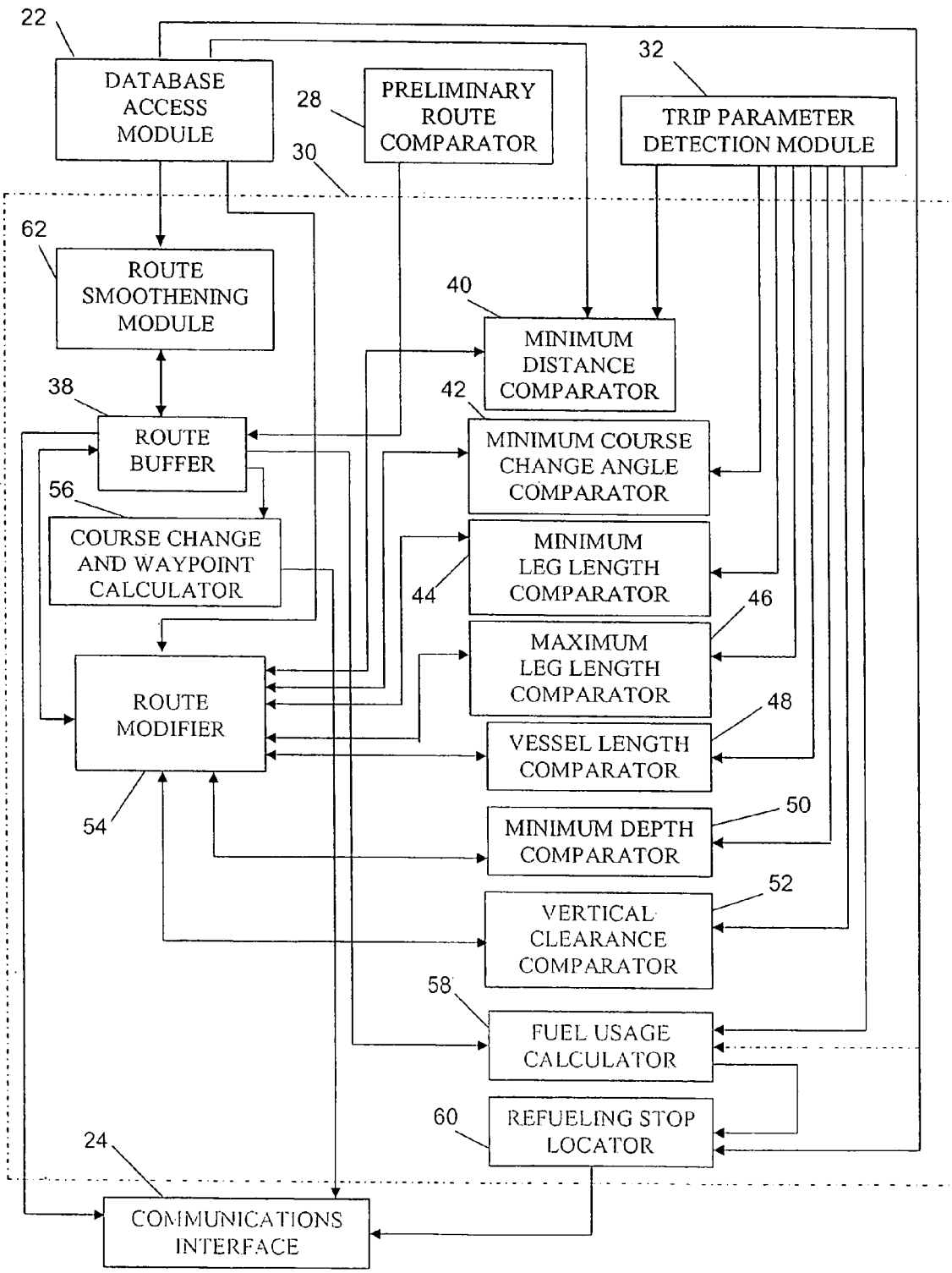
FIG. 3 is a block diagram of selected functional components of a rout modification module illustrated in FIG. 2.

Trip parameter detection module 32 (FIGS. 2 and 3) is connected to route modification module 30 for supplying that module with additional trip parameters from a user computer 18a, 18b, . . . 18n. As illustrated in FIG. 3, route modification module may include software-implemented modules: a minimum distance comparator 40, a minimum course change comparator 42, a minimum leg length comparator 44, a maximum leg length comparator 46, a vessel length comparator 48, a minimum depth comparator 50, and a vertical clearance comparator 52. Trip parameter detection module 32 is connected to these comparators for feeding user-defined parameters to them. Comparators 40, 42, 44, 46, 48, 50, and 52 are connected to route buffer 38 for receiving tentative or modified preliminary route data therefrom to enable the comparators to check the tentative route in buffer 38 against respective user-supplied parameters as relayed via trip parameter detection module 32.

Comparators 40, 42, 44, 46, 48, 50, and 52 typically take the form of generic comparator circuity of a general purpose computer, that circuitry having been modified by software routines to carry out the prescribed analysis of the tentative route data. Comparators 40, 42, 44, 46, 48, 50, and 52 may be connected directly (not shown) to route buffer 38 or indirectly via a route modifier 54. Route modifier 54 adjusts a tentative route in buffer 38 pursuant to instructions from comparators 40, 42, 44, 46, 48, 50, and 52.

Where the information received from a user computer 18a, 18b, . . . 18n includes one or more minimal acceptable distances, for instance, a minimal acceptable distance from land, a minimal acceptable distance from charted hazards, or a minimal distance from user provided boundaries, comparator 40 analyzes the tentative route in buffer 38 to determine whether the tentative route complies with the requested minimum distance(s). If not, comparator 40 and route modifier 54 cooperate to ensure that minimum requested distances are observed, to the extent that is possible. To that end, route modifier 54 is connected to database 12 via access module 22.

If the information received from a user computer 18a, 18b, . . . 18n includes a minimum course change angle, comparator 42 inspects the tentative route in buffer 38 to determine whether the tentative route conforms to the specified minimum course change angle. If not, comparator 42 and route modifier 54 cooperate to ensure that minimum requested course change angle is complied with, to the extent possible.

If the information received from a user computer 18a, 18b, . . . 18n includes a minimum leg length, comparator 44 inspects the tentative route in buffer 38 to determine whether the tentative route conforms to the specified minimum leg length. If not, comparator 44 and route modifier 54 cooperate to ensure that the legs of the tentative route have at least the specified minimum leg length, to the extent possible.

If the information received from a user computer 18a, 18b, . . . 18n includes a maximum leg length, comparator 46 inspects the tentative route in buffer 38 to determine whether the tentative route conforms to the specified maximum leg length. If not, comparator 46 and route modifier 54 cooperate to ensure that the legs of the tentative route are no longer than the specified maximum leg length, to the extent possible.

Where the information received from a user computer 18a, 18b, . . . 18n includes vessel length, comparator 48 examines the tentative route in buffer 38 to determine whether the tentative route accommodates the vessel length specified. For instance, comparator 48 may determine whether course changes in a harbor are practically possible give the vessel length. If not, comparator 48 and route modifier 54 cofunction to change the tentative route so that the vessel length is properly accommodated.

Comparator 48 may also function to check that a vessel of the particular type indicated by the user may legally and physically travel along the entire tentative route. For instance, power boats may be prohibited in some areas. In that case, comparator 48 and route modifier 54 adjust the tentative route in buffer 38 to comply with the legal restrictions.

Where database 12 stores only digitized routes that have been previously vetted for adequate depth clearance, the function of comparator 50 may be inherently performed by the mere selection of route segments from database 12 to serve as legs of a tentative route. Alternatively, where the depth data in database 12 is raw data, comparator 50 functions to ensure that the tentative route in buffer 38 complies with a minimum depth as specified by the user.

Where database 12 includes bridge height data and the information received from a user computer 18a, 18b, . . . 18n includes a vertical clearance, comparator 52 compares the vertical clearance against any bridge heights or the heights of any other above-water or overhead obstructions as recorded in database 12. If a vertical clearance is insufficient to accommodate a vessel height, then comparator 52 works with route modifier 54 to construct an alternate route that does not include the bridge or overhead obstruction.

Route modification module 30 includes a course change and waypoint calculator 56 that is connected to route buffer 38 for computing course change angles and determining latitudes and longitudes of the course change locations or waypoints. Calculator 56 is connected to communications interface 24 for transmitting waypoints and course change angles to the respective user computer 18a, 18b, . . . 18n via the Internet 16.

Where raw depth data is stored in database 12, grid line generator 34, depicted in FIG. 2, may be provided to encode grid lines and grid coordinates and transfer that information together with depth contours from database 12 to depth determination module 36. Module 36 assigns respective depth values to grid lines. The preliminary route extends along grid lines (see FIG. 5). The programming for modifying the preliminary route then includes routines for replacing zig-zag portions of the preliminary route with straighter or smoother route segments, i.e., with fewer legs and therefore fewer course changes.

Figure 5:
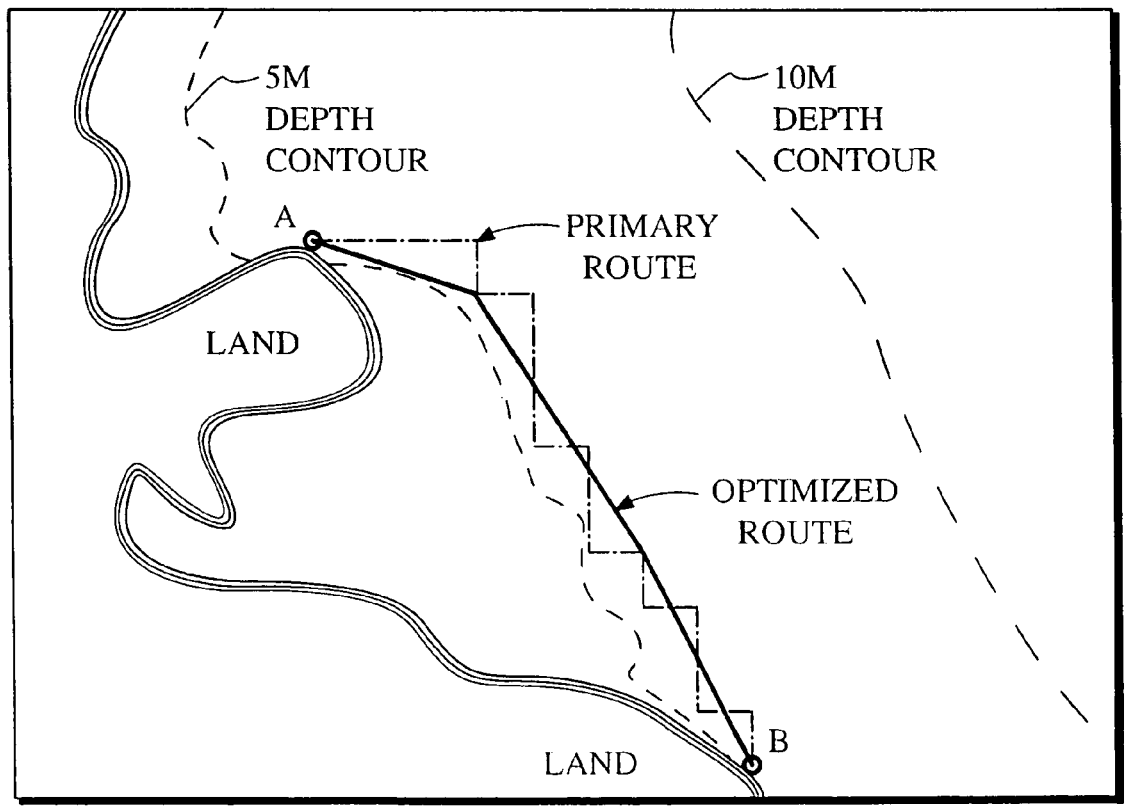
FIG. 5 is a map depicting another example of successive marine routes determined by the system of FIGS. 1–3 in carrying out an alternative route optimization method in accordance with the present invention.

FIG. 5 illustrates an example of a zig-zag preliminary route derived by preliminary route module 26 (FIG. 2) in accordance with grid line data from depth determination module 36. FIG. 5 also shows an optimized route were the many course changes of the zig-zag preliminary route are virtually eliminated in favor of the smoother optimized route. Both the preliminary route and the optimized route avoid shallow water on a land side of a 5 meter depth contour. The optimized route is a smooth path on the deep side of that depth contour.

As illustrated in FIG. 3, route modification module 30 may further include a fuel usage calculator 58 connected to route buffer 38 for determining a distance that a user can travel along a tentative route. Calculator 58 makes this determination in response to input as to fuel usage rate received from the respective user computer 18*a*, 18*b*, ... 18*n* via trip parameter detection module 32. Route modification module 30 additionally includes a refueling stop locator 60 operatively connected to database 12 via access module 22 and to fuel usage calculator 58 for determining at least one refueling location for the user along the tentative (and eventually recommended) route. Where database 12 includes data as to water currents, fuel usage calculator 58 is program-controlled to compute fuel usage in part in accordance with the water current data in the database.

Route modification module 30 may incorporate, as a separate functionality or as an inherent component of route modifier 54, a route smoothening module 62 that operates on preliminary or tentative routes in buffer 38 to reduce the number of course changes and, concomitantly, the number of route legs. Of course, where the user places restrictions, such as minimum and maximum leg lengths and minimum course changes, then the action of route smoothening module 62 is necessarily circumscribed.

A navigation assistance method as carried out by the system of FIGS. 1–3, includes receiving, via the Internet 16, information from a user computer 18*a*, 18*b*, . . . 18*n* pertaining to a water trip contemplated by the user, accessing database 12, deriving at least one recommended over-water route in response to the user information and in accordance with waterway data in database 12, and communicating the route to the user via the Internet 16. The recommended route includes only route segments extending through operatively navigable areas.

Unnavigable areas include regions that no ship, boat, raft or other water vessel can navigate, for instance, land areas such as islands. Unnavigable areas further include regions of surface water that are not deep enough for navigation at least by the user's vessel, or that are proximate to above-surface obstructions such as bridges or docks to underwater obstructions such as sandbars or submerged wrecks.

The recommended route is communicated to the user in the form of a map (See FIGS. 4, 5, 8, and 9 that is displayed on the monitor of the respective user computer 18*a*, 18*b*, . . . 18*n*. The route typically includes latitude and longitude coordinates derived by course change and waypoint calculator 56 that define trip leg termini and waypoints. Alternatively, a route may be completely specified by multiple latitude and longitude coordinate pairs. In addition, course-change angles or compass bearings may be included in the route information for assisting the user in making course changes at waypoints while en route, whereby the user moves from one leg to another leg of the route.

As discussed hereinabove, route determination unit 20 derives a recommended route typically by initially generating a preliminary route and modifying the preliminary route in an optimization process to generate the recommended over-water route. The preliminary route may be suggested in whole or in part by the user (via the Internet 16), while the optimization process may be implemented by an iterative technique implemented in part by route modifier 54.

Preliminary route comparator 28 modified the preliminary route by comparing the preliminary route with information in database 12 to determine unnavigable segments of the preliminary route and replacing the unnavigable segments with navigable alternate route segments. (See FIG. 4.) Route modification module 30 derives additional route alterations in accordance with trip particulars supplied by the user as discussed above with reference to comparators 40, 42, 44, 46, 48, 50, and 52.

In one embodiment of the system, the grid line generator 34 and depth determination module 36 assign respective depth values to grid lines. In that case, the preliminary route extends along grid lines, and the modifying of the preliminary route includes replacing zig-zag portions of the preliminary route with straighter or smoother route segments. (See FIG. 5.) Typically, preliminary route comparator 28 and route modification module 30 perform multiple straightening or smoothing iterations to derive an optimal route.

Where the information received from the user includes a fuel usage rate, fuel usage calculator 58 and refueling stop locator 60 cofunction to determine at least one refueling location for the user along the route. This refueling location may be computed by determining a distance of travel along a projected route for a tank of fuel and then determining a fueling station that is located close to the projected route prior to a fuel depletion point. It is possible to take local currents into account in determining the distance of travel and the associated fuel depletion point. Travel with a current uses less fuel than travel against a current. Currents may be river currents, tide currents, or ocean currents. The database may include data with respect to one or more of these water currents.

Figure 7:
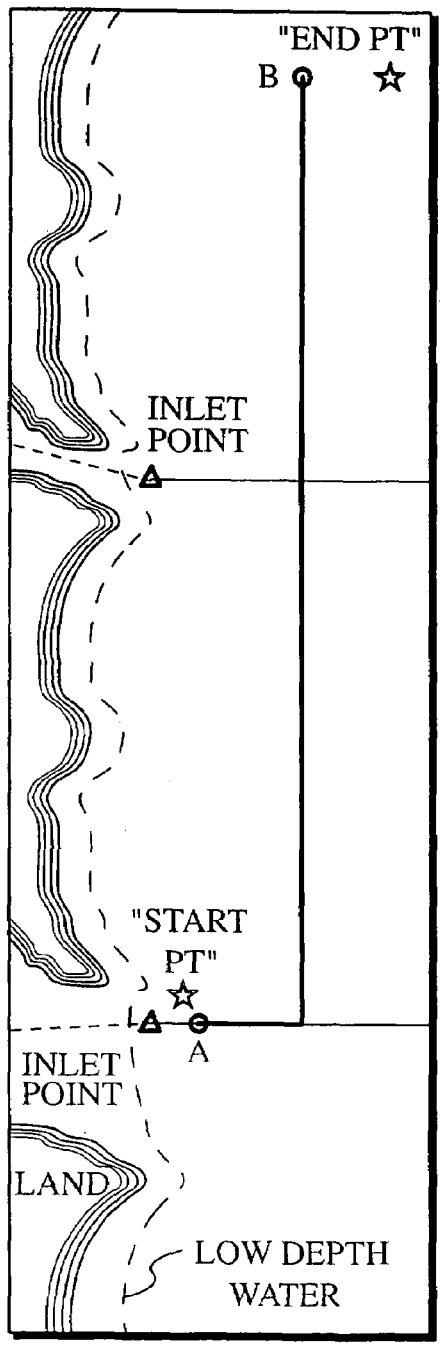
FIG. 7 is a map of coastal waters, showing a preliminary route in a route optimization or derivation method in accordance with the present invention.
Figure 8:
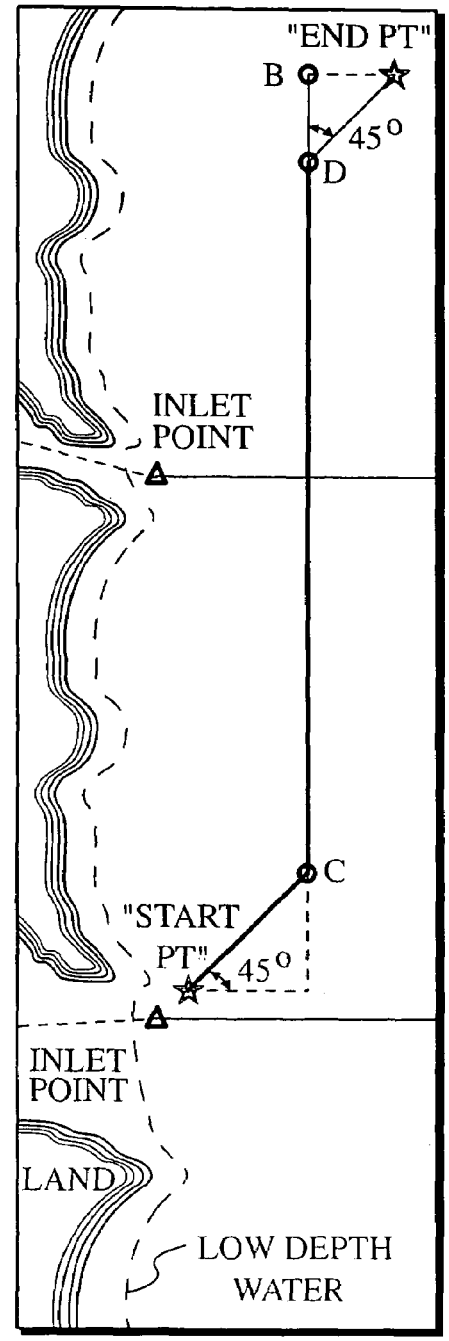
FIG. 8 is a map similar to FIG. 8, showing a recommended marine or over-water route as a modification of the preliminary route shown in FIG. 7.
Figure 9:
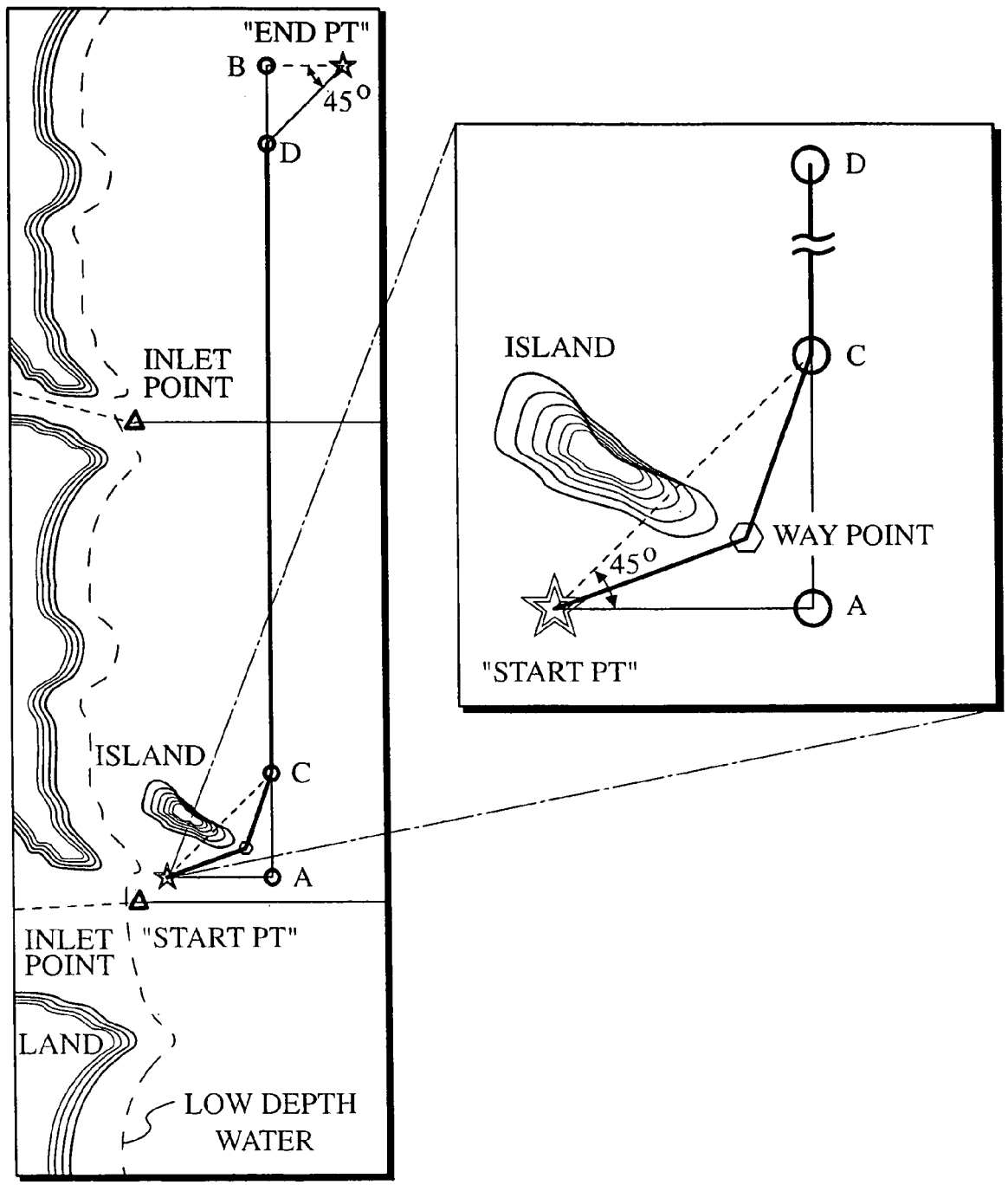
FIG. 9 is a map similar to FIGS. 7 and 8, showing an obstruction in the form of an island and a route plotted around the island.

With reference to FIG. 7, where database 12 stores digitized route segments a preliminary route generated by module 26 (FIGS. 2 and 3) begins at a closest marine route to a starting point selected by the user. The marine route is computed and displayed as extending between points A and B on the digitized route. This preliminary marine route may be modified as shown in FIG. 8 where the distance to be traveled along the preliminary route is greater than the system defined minimum distance parameter. Route modification module (30) and more particularly maximum leg length comparator 46 may calculate 45 degree angles and a beginning route leg (A-C) and an ending route leg (D-end point) as course adjustments to reduce the overall route distance. The modified route will be within the required depth and free from navigational obstacles.

Where there is an obstacle such as an island shown in FIG. 9, the testing of a tentative beginning route segment (A-C) by route modification module 30 reveals the presence of the obstruction. Module 30 will then attempt to circumnavigate the obstacle by selecting a 67 degree angle or a 22 degree angle. If neither of these alternative course changes produces an acceptable route, a waypoint may be introduced to avoid the obstacle.

Where database 12 does not contain digitized route segments, server computer 14 and more specifically route determination unit 20 computes an optimal or recommended route based on the user-provided start and end points and any obstructions between the two. Route determination unit 20 first calculates a straight line between the start and end points and compares that route with obstruction and depth data in database 12. On the one hand, if the calculated route is free of obstructions, that route becomes the recommended route communicated to the user. On the other hand, if an obstruction is detected, then route determination unit 20 alters the route by discrete angles as described above. If a relatively dense grid is used, then the selected path is smoothed to produce the final recommended route.

Generating the contents of database 12 is facilitated by using S-57 format data, the electronic data transfer standard prepared by the International Hydrographic Organization (IHO) committee. The importing of Electronic Navigational Charts (ENC) files provides a highly accurate vector data set that is ideal as fundamental data. This vector data is processed to form the basic contents of waterway database 12. The processing may include, to the extent possible, forming a continuous or seamless collection of maps covering all marine areas to be serviced by the navigation assistance system. This map merging or collating process includes, but is not limited to, edge matching and dissolving some map polygons and is facilitated if contiguous maps are of the same scale. The scale of one or more individual raw-data maps may be changed as necessary to enable the formation of a composite seamless map. The processing of the fundamental data may further include generating a digital terrain model, for example, in the form of a triangulated irregular network. Depth contours are then generated and processed to define closed depth polygons. Alls obstacles are identified and overlaid with the water depth polygons.

Digitization of routes can generally occur after processing of the fundamental information. Major routes between major coastal urban centers may be digitized with at least two alternatives. The alternative routes are connected at regular intervals to build a network. The major routes may come in sets, for different depth contours, for instance, 6 foot, 10 foot, and 30 foot contours. Harbor networks are preferably denser and take into consideration applicable navigational restrictions, while supporting connectivity between routes. Each channel and bridge is associated with a critical line segment that presents the necessary crossing restriction information (width, height). The digitized routes may be created in accordance with the following requirements: (i) each route is within a specified water depth polygon, (ii) no route crosses or touches obstacles (islands, forbidden areas, etc.), (iii) the routes use navigational channels and bridges, (iv) the network of routes is dense enough to reach potential destination within a specified number of feet (e.g., 500 feet). The map information may be further processed into compressed image format and pyramids built to support the retrieval of individual map sections.

The users may be provided with access to the entire seamless collection of maps. Of course, the users will be able to print the downloaded map or map sections, as well as the recommended route particulars, at their option. Georeferenced images may be displayed as a backdrop to the seamless map or portions thereof.

The Worldwide Web Consortium's (W3C) open standard for XML graphics for the Web, called SVG (Scalar Vector Graphics), is useful to project the geospatial data over the Web/Internet. SVG is a language for describing two-dimensional graphics and graphical applications in XML for Web applications. However, one could use any other commercially available products to serve the program on the web.

In addition to transmitting a recommended over-water route to a user computer 18a, 18b, . . . 18n, server computer 14 may transmit ancillary information of interest to the user. Such ancillary information may include particulars as to tides and currents, buoy locations, and projected weather along the route. It is possible for the tide, current, and weather information to be tailored to the expected time of the planned trip. Alternatively, this information may be provided on the assumption that the trip is to occur immediately. In that case, the user may obtain an update, if necessary, at the time the trip is actually commenced. Additional information provided to the user may include CMAN data, refueling locations, restaurant descriptions, historical sites, and tourist information.

An additional feature of the navigation assistance system disclosed hereinabove is that it finds the closest port inlet and/or outlet depending upon the user location and specification. The system software accomplishes this by drawing a circle of x nautical miles around the reported user location and querying/travesing the waterway database to come up with the appropriate results. This feature helps mariners especially when they are in dire straits or low on fuel or when a storm is approaching, etc., and they want to get to safer grounds as soon as possible.

Also, the system may update waterway database 12 in real time for users to see changes on the charts in near real time. For example, if the Coast Guard reports a wreck off the coast of city x, waterway database 12 is updated to include that wreck location. Now the routing program will avoid the wreck whenever the users are plotting routes around that area. In another example, the Navy is conducting exercises in a certain area and they need it to be out of bounds for recreational mariners. The navy communicates the particulars as to the naval exercises to server computer 12 or to manual operators, who update database 12 and the users are not provided with routes close to the proscribed area.

Any individual users whose vessels are properly equipped can have their routes tracked by satellite (via GPS components) in real time or quasi-real time (periodically). The actual tracked positions of vessels can be displayed via on-board monitors while the users are en route. Where the individual user has wireless Internet access on a vessel, changes in route can be made while en route, using the navigation assistance method and system detailed hereinabove. The software for the navigation system may be delivered to the user via CD, the Internet, or any other portable electronic digital media.

With respect to FIG. 6, it is to be noted that various pieces of information (refueling locations, restaurant locations, buoy locations, shipyards, historical sites, shipwrecks, etc.) may be posted as legends on a map of a given area. Alternatively, such information may be provided as separate text, with latitude and longitude coordinates.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A navigation assistance method comprising:
   receiving, via a computer network, information from a user pertaining to a water trip contemplated by the user;
   accessing a database storing waterway data;
   deriving at least one recommended over-water route in response to the user information and in accordance with waterway data in said database, the deriving of said route comprising including only route segments extending through operatively navigable areas; and
   communicating said route to the user via said computer network.

2. The method defined in claim 1 wherein the deriving of said route includes generating a preliminary route and modifying said preliminary route in an optimization process to generate said recommended over-water route.

3. The method defined in claim 2 wherein the modifying of said preliminary route includes comparing said preliminary route with information in said database to determine unnavigable segments of said preliminary route and replacing the unnavigable segments with navigable alternate route segments.

4. The method defined in claim 3 wherein the modifying of said preliminary route further includes incorporating route alterations in accordance with trip particulars supplied by the user.

5. The method defined in claim 4 wherein said trip particulars include minimum distance from land.

6. The method defined in claim 2 wherein the generating of said preliminary route includes defining said preliminary route pursuant to information received from the user via said computer network.

7. The method defined in claim 2 wherein the deriving of said route further includes assigning respective depth values to grid lines, said preliminary route extending along grid lines, the modifying of said preliminary route including replacing zig-zag portions of said preliminary route to reduce the number of course changes.

8. The method defined in claim 1 wherein the information received from the user includes a start point, an end point, and a minimal depth, the deriving of said route including accessing said database to account for depths along at least one route extending between said start point and said end point.

9. The method defined in claim 8 wherein the information received from the user further includes a fuel usage rate, further comprising determining at least one refueling location for the user along said route.

10. The method defined in claim 9 wherein said database includes data as to water currents, the determining of said refueling location including calculating fuel usage in part in accordance with the water current data in said database.

11. The method defined in claim 8 wherein the information received from the user further includes at least one minimal acceptable distance selected from the group consisting of minimal acceptable distance from land, minimal acceptable distance from charted hazards, and minimal distance from user provided boundaries.

12. The method defined in claim 8 wherein the information received from the user further includes at least one route segment parameter taken from the group consisting of a minimum course change angle, a minimum leg length, and a maximum leg length.

13. The method defined in claim 8 wherein the information received from the user further includes vessel type and vessel length.

14. The method defined in claim 8 wherein said database includes bridge height data, the information received from the user further including a vertical clearance, the deriving of said route including comparing said vertical clearance against a bridge height in said database.

15. The method defined in claim 1 wherein said database includes depth information determined in part by tide data, the deriving of said route including accounting for said tide data.

16. The method defined in claim 1 wherein said database includes depth contour information.

17. The method defined in claim 1 wherein said database includes information as to water currents.

18. The method defined in claim 1 wherein said route includes at least one waypoint.

19. A navigation assistance system comprising:
a database storing waterway data including depth information; and
a server computer connected to a global computer network, for receiving information from a user pertaining to a water trip contemplated by the user,
said computer being connected to said database for accessing waterway data stored therein,
said server computer being programmed with software for deriving at least one recommended over-water route in response to the user information and in accordance with waterway data in said database,
the software comprising programming for including only route segments extending through operatively navigable areas, said server computer communicating said route to the user via said computer network.

20. The system defined in claim 19 wherein said software includes programming for generating a preliminary route and modifying said preliminary route in an optimization process to generate said recommended over-water route.

21. The system defined in claim 20 wherein said software further includes programming for comparing said preliminary route with information in said database to determine unnavigable segments of said preliminary route and replacing the unnavigable segments with navigable alternate route segments.

22. The system defined in claim 21 wherein the programming for modifying said preliminary route includes routines for incorporating route alterations in accordance with trip particulars supplied by the user.

23. The system defined in claim 22 wherein said trip particulars include minimum distance from land.

24. The system defined in claim 20 wherein the programming for generating said preliminary route includes routines for defining said preliminary route pursuant to information received from the user via said computer network.

25. The system defined in claim 20 wherein said software further includes programming for assigning respective depth values to grid lines, said preliminary route extending along grid lines, the programming for modifying said preliminary route including routines for replacing zig-zag portions of said preliminary route with straighter route segments.

26. The system defined in claim 19 wherein the information received from the user includes a start point, an end point, and a minimal depth, said software including programming for accessing said database to account for depths along at least one route extending between said start point and said end point.

27. The system defined in claim 26 wherein the information received from the user further includes a fuel usage rate, said software further including programming for determining at least one refueling location for the user along said route.

28. The system defined in claim 27 wherein said database includes data as to water currents, said programming including routines for calculating fuel usage in part in accordance with the water current data in said database.

29. The system defined in claim 26 wherein the information received from the user further includes at least one minimal acceptable distance selected from the group consisting of minimal acceptable distance from land, minimal acceptable distance from charted hazards, and minimal distance from user provided boundaries.

30. The system defined in claim 26 wherein the information received from the user further includes at least one route segment parameter taken from the group consisting of a minimum course change angle, a minimum leg length, and a maximum leg length.

31. The system defined in claim 26 wherein the information received from the user further includes vessel type and vessel length.

32. The system defined in claim 26 wherein said database includes bridge height data, the information received from the user further including a vertical clearance, said software further including programming for comparing said vertical clearance against a bridge height in said database.

33. The system defined in claim 19 wherein said database includes depth information determined in part by tide data, said software including programming for accounting for said tide data.

34. The system defined in claim 19 wherein said database includes depth contour information.

35. The system defined in claim 19 wherein said database includes information as to water currents.

36. The system defined in claim 19 wherein said route includes at least one waypoint, said software including programming for computing said waypoint.

* * * * *